May 15, 1934.  W. NEWCOMB  1,959,003
DEVICE FOR PRODUCING HOMOGENEOUS OR INTEGRATED ARTIFICIAL ICE COMMERCIALLY
Original Filed March 18, 1924
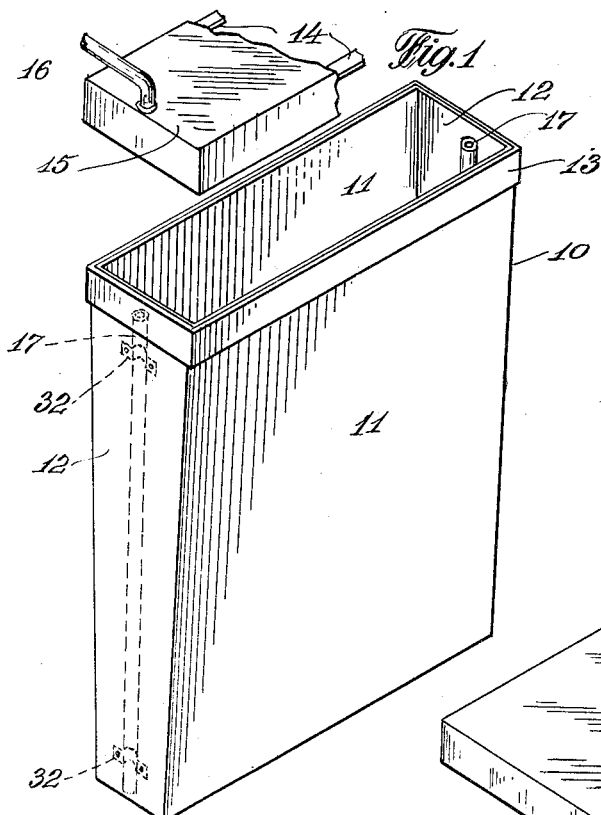
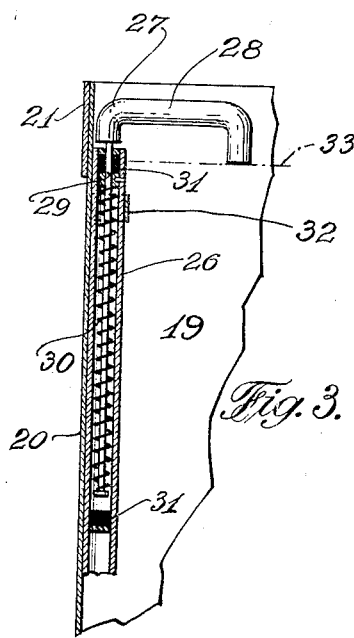
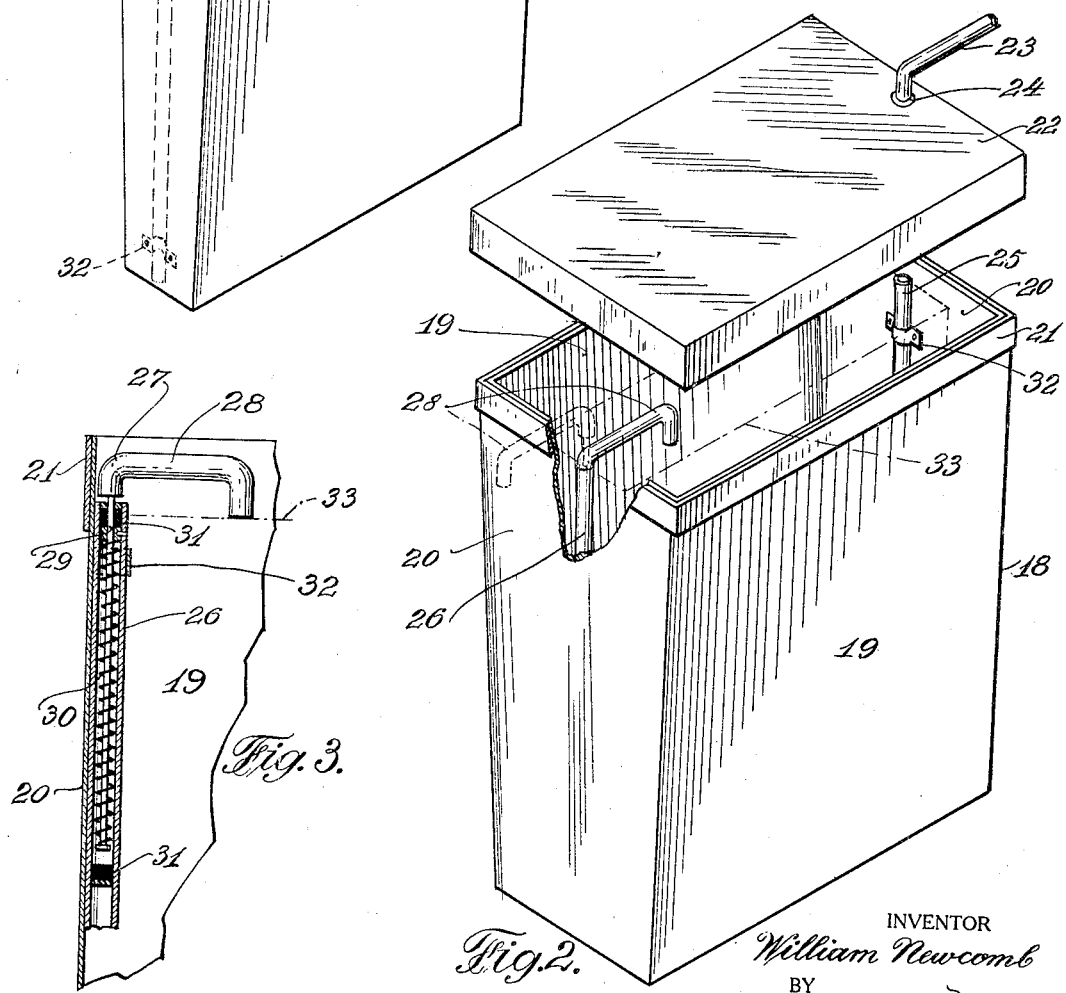
INVENTOR
William Newcomb
BY
William F. Nickel
ATTORNEY Patented May 15, 1934

1,959,003

UNITED STATES PATENT OFFICE 1,959,003

DEVICE FOR PRODUCING HOMOGENEOUS OR INTEGRATED ARTIFICIAL ICE COMMERCIALLY

William Newcomb, New York, N. Y.

Refiled for abandoned application Serial No. 699,331, March 18, 1924. This application May 13, 1929, Serial No. 362,737. Renewed March 23, 1933

4 Claims. (Cl. 62—157)

This invention relates to the device for producing homogeneous or integrated artificial ice commercially.

One object of my invention is to provide a process which not only will facilitate and speed up artificial ice production, but which will produce cakes of ice absolutely homogeneous, and as I term it, integrated, and which cakes of ice will have the property when broken into parts, to break over the entire width of the cake and not split into its component parts when broken.

Another object of invention is to produce a method whereby air bubbles, usually preventing ice from congealing to a solid mass, are extracted from the freezing water, whereby a more compact cake of ice is produced.

A still further object of my invention is to provide a method which will greatly shorten the time of production, without deteriorating the quality of the ice.

Another object of my invention is to provide a method whereby the solids contained in the water are caused to settle to the bottom of the future cake of ice.

A further object of my invention is to provide devices for facilitating the method of production of integrated artificial ice.

The foregoing and still other objects will be more fully apparent from the following description and the accompanying drawing, forming a part of the specification, and in which:

Figure 1 is a perspective view of a container, employed in my process.

Figure 2 is a perspective view of a similar container but of greater width than the former.

Figure 3 is a detailed view, partially in crosssection, showing an ice cake holder, as employed within the larger container.

Figure 4 is a cross-sectional view through an ice cake produced by my method.

Referring to the drawing, numeral 10 denotes a container having tapered sides 11 and narrow tapering end walls 12 and a reinforcing rim at the top of the container indicated at 13. That rim widens the upper edge of the container and serves as a seat for a gasket indicated at 14 and sets in the cover 15 which is adapted to be placed upon the top of the container and hermetically closes the latter, except for one opening in the cover through which leads a pipe connection 16, by means of which the air is exhausted from covered container.

Associated with the end walls 12 and set within the container, are longitudinal, removable, hollow ice cake guides indicated at 17. These guides serve for providing the future ice cake with guide grooves, the purpose of which will be explained presently. These guides may be removed when only single cakes are required and they may be employed for sucking from the bottom of the containers, sediments or foreign matter contained in the water, which foreign matter is detrimental to the quality of ice.

In Figure 2 there will be seen a similar container 18, having tapered sides 19 and somewhat narrower, end walls 20. A reinforcing rim 21 is provided at the top of the container and a cover 22 is adapted to be set upon the rim 21.

A similar gasket as shown in Figure 1 but not shown in Figure 2 is intended to hermetically seal the container when covered. An exhaust pipe 23 communicates through opening 24 of the cover with the interior of the container.

To the end walls are again attached longitudinal, removable and hollow guides 25 and 26. The latter guide 26 is shown in detail in Figure 3 and contains a spring actuated ice cake holder 27, which comprises an arm 28 extending beyond guide 26 and a guide rod 29 which extends into the guide 26 and is held downwards by expansion spring 30. To prevent water from entering guide 26, and deteriorating the spring 30, or impairing the operation of ice cake holder 27, packing indicated at 31 is provided. The top of the guide 26 is perforated and the rod 29 passes through it and the upper packing 31. The spring 30 encircling the rod abuts the upper packing and a head on the lower end of the rod 29. The lower packing 31 below the rod and spring is of course not perforated.

Guides 17, 25 and 26 are removable, as has been said and are held in place in any convenient manner. For the purpose of understanding, clips 32 are shown, but any other means may be employed.

Having described the devices employed in my method it will not be difficult now to explain my process.

Can or container 10 is filled with water to about the height of the ice cake guides 17. The water is permitted to stand or settle so that the sediments or foreign matter heavier than water, may drop to the bottom and when thus separated from the water, the lower portion of the water may be drawn out through the guide 17 by attaching a pump thereto, not shown in the drawing.

Now, the cover 15 is placed upon the rim of the container. The air is drawn out from the container through pipe 16, which latter is provided with a check valve, not shown, so that a vacuum or a partial vacuum is maintained within the container. The latter is now subjected to freezing temperature in any conventional way, as for instance, inserting it into a tank with freezing brine solution.

It will be noted that the width of the container and therefore the width of the future cake of ice is about half the size of that shown in Figure 2.

The water in container 10 freezes to a solid cake of ice in a certain period of time, say in 12 hours. When, now, the water is completely frozen, can 10 is removed from the brine solution, dipped into hot water so that the ice is freed from the can and the cake of ice is now removed from container 10 and placed into container 18 in such a way that the grooves produced by guides 17 in container 10, are utilized to guide the ice cake into container 18, where guides 25 and 26 take the place of guide 17 of the smaller container, and enter said grooves.

If by any chance, the grooves formed in the cake by guides 17 should not exactly coincide with the guides 25 and 26 of container 18, the latter guides may be adjusted within their clips 32 so that the cake of ice is held approximately centrally within container 18.

Preferably the guides 17, 25 and 26 are secured to the inner faces of the cans 10 and 18 by means which do not project, but leave the guides smooth over their entire length to facilitate removal of the ice after formation thereof.

Prior to inserting the smaller cake of ice which is indicated in the broken lines at 33, the arm 28 of the ice cake holder is lifted and turned outwards of the container as indicated in dashed and dotted lines in Figure 2.

When the cake is inserted in container 18, the arm 28 is placed on top of cake 33 which is now held solid between the guides 25 and 26. Then the water is poured into container 18 until the top surface of the water reaches the top surface of the cake 33. The cake 33 being held by arm 28 of the ice cake holder cannot float upward as would be the case if the cake would be free to move. It is well known that the buoyancy of ice in water causes about 1/9 of the height of the ice to protrude above the water.

Now, the water is permitted to settle. The sediments are drawn off through one of the hollow guides, for instance, that marked 25, and the container is refilled to the previous level. Then, the cover 22 is placed upon the container, hermetically seals the same, and the air is drawn through pipe 23 from within the container, thus creating a partial vacuum therein. Pipe 23 is also provided with a check valve, not shown, adapted to prevent air from entering the container when the vacuum is formed therein. The container is then subjected to freezing.

Through the creation of the vacuum, the air bubbles in the first produced cake of ice and the one now forming, are drawn out in which manner the ice becomes more solid.

Of particular importance is the fact that air bubbles which usually form upon the surface of the smaller ice cake and separate the latter from the surrounding ice now forming, are withdrawn from the container through the formation of vacuum therein, whereby the large ice cake so solidifies and congeals with the small ice cake, that the ice then becomes an absolutely homogeneous and integrated mass.

The fact that in my method, contrary to heretofore employed processes, the water is frozen without agitation and under vacuum, the objectionable impurities in the ice are not distributed throughout the entire cake, or are not reposing at the center of the cake, but remain at the bottom, and may be readily removed.

Besides the fact that these ice pieces are separated, the smaller ice cake having been permitted to float in the water, protrudes above the later formed ice cake making the handling of the ice quite difficult and even dangerous.

When the cake is to be divided, as is usually the case when delivery is made, it will be found that artificial ice produced by heretofore used methods, will part at the air spaces formed, and fall into small, irregular pieces.

In Figure 4, there will be seen the product obtained through employing my method in connection with the devices shown in the drawing.

A perfectly solid continuous piece of ice is formed which is as homogeneous as if the ice had been formed in one mass. The advantage of my method will be readily evident from the following comparison.

In making artificial ice in single large containers, similar to that shown in Figure 2, the time required for freezing the water is about 48 hours, and the product obtained shows that only the walls are properly solidified, while the interior of the ice remains liquid or soft and invariably leaves a hollow space.

The solids, sediments and impurities in the thus produced large cake, remain in the ice and the ice itself is porous and full of air bubbles and consequently not solid.

The other method of making ice in two freezing periods similar to mine, produces an unsolidified cake of ice also full of air bubbles and an air space between the two portions of ice.

My method produces a solid, homogeneous cake, without air bubbles or with as few air bubbles as is humanly possible. Such an ice cake, will firstly, be cheaper and quicker in production, will be readily dividable into any parts without splitting irregularly, and will consume a comparatively smaller space for its weight which is commercially of great importance.

When a number of small containers as shown in Figure 1 and large containers as shown in Figure 2, are operated at one time, a continuous and very rapid production may be achieved, consuming about ⅙ of the time heretofore used for the same quantity and producing a much better quality of ice.

While I have shown a specific form of my device in the drawing, be it understood that any equivalent thereto may be employed without departing from the broad scope of my invention for which I claim.

1. In a device for making integrated artificial ice, a container, longitudinal, removable guides within said container, ice cake holding means associated with at least one of the guides normally extending into said container and capable of being moved out of the container, an air tight cover for said container and means associated therewith for facilitating exhausting air from said container.

2. In a device for making artificial ice, a container having at least two sloping side walls, longitudinal, hollow and removable guides disposed within said container, ice cake holding means associated with at least one of said guides and normally extending into said container, but capable of being swung out of said container, a removable cover for said container, means for hermetically sealing said cover upon said container, and means associated with said cover for facilitating exhausting air from said container.

3. In a device for making artificial ice, a generally tapered container adapted to be hermetically sealed, adjustable, hollow, longitudinal ice cake guides within said container, and an ice cake holder associated with one of said guides and comprising a spring controller arm capable of being revolved and moved in vertical direction.

4. In a device for making artificial ice, including a general tapered container equipped with longitudinal, hollow adjustable guides and a hermetically closeable cover, an ice cake holder for keeping a cake of ice submerged in water, said holder associated with one of the guides and comprising a swingable arm, a spring controlled rod associated with said arm, and means of preventing water from entering the hollow space of the guide where said holder operates.

WM. NEWCOMB.